March 6, 1945.  L. B. PORTMAN ET AL  2,370,813
GRINDING MACHINE
Filed Sept. 21, 1942  2 Sheets-Sheet 1
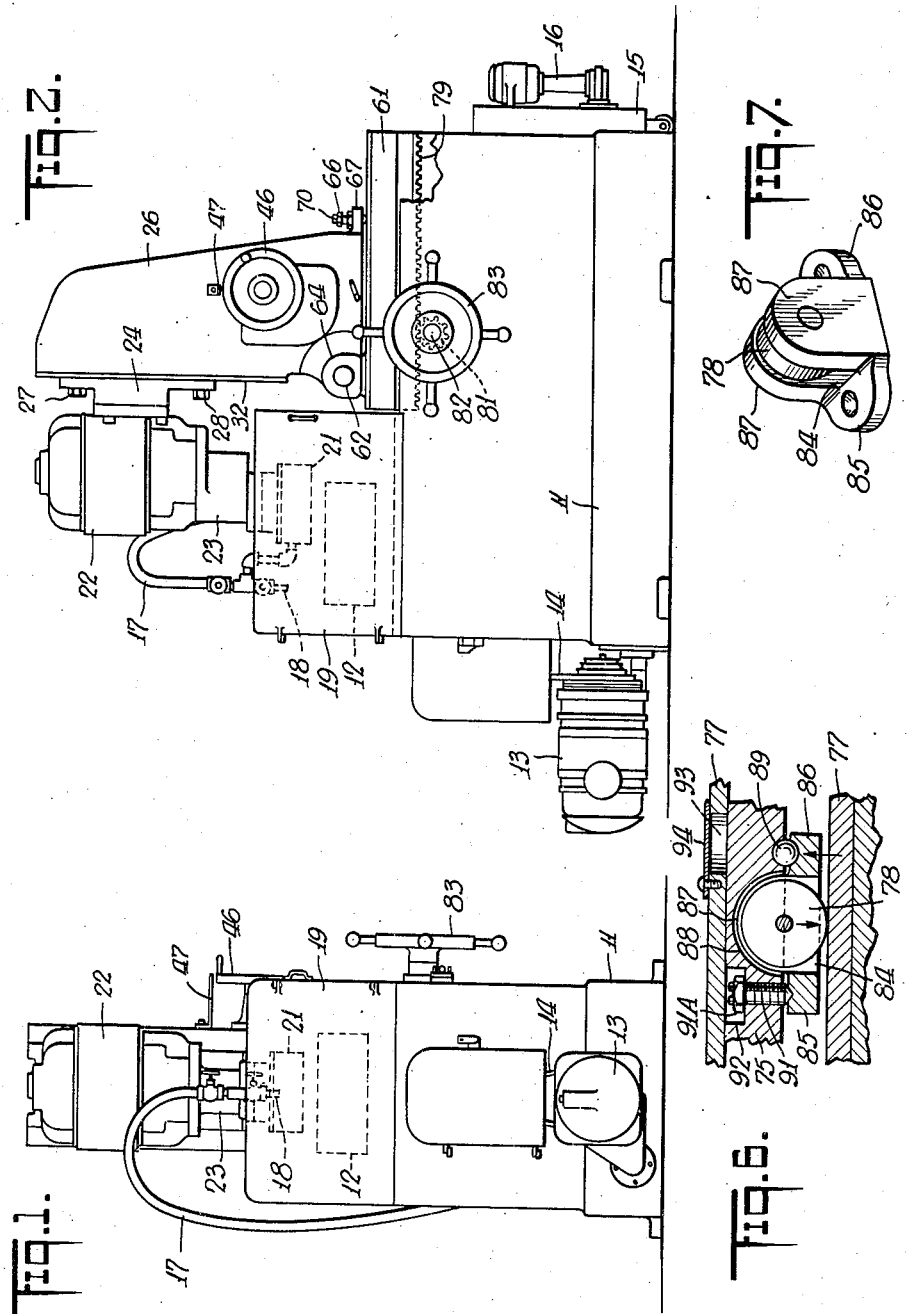
INVENTORS
LAWRENCE B. PORTMAN
RAYMOND H. PORTMAN
FRANK J. ACTON
BY
ATTORNEY March 6, 1945.   L. B. PORTMAN ET AL   2,370,813
GRINDING MACHINE
Filed Sept. 21, 1942   2 Sheets-Sheet 2
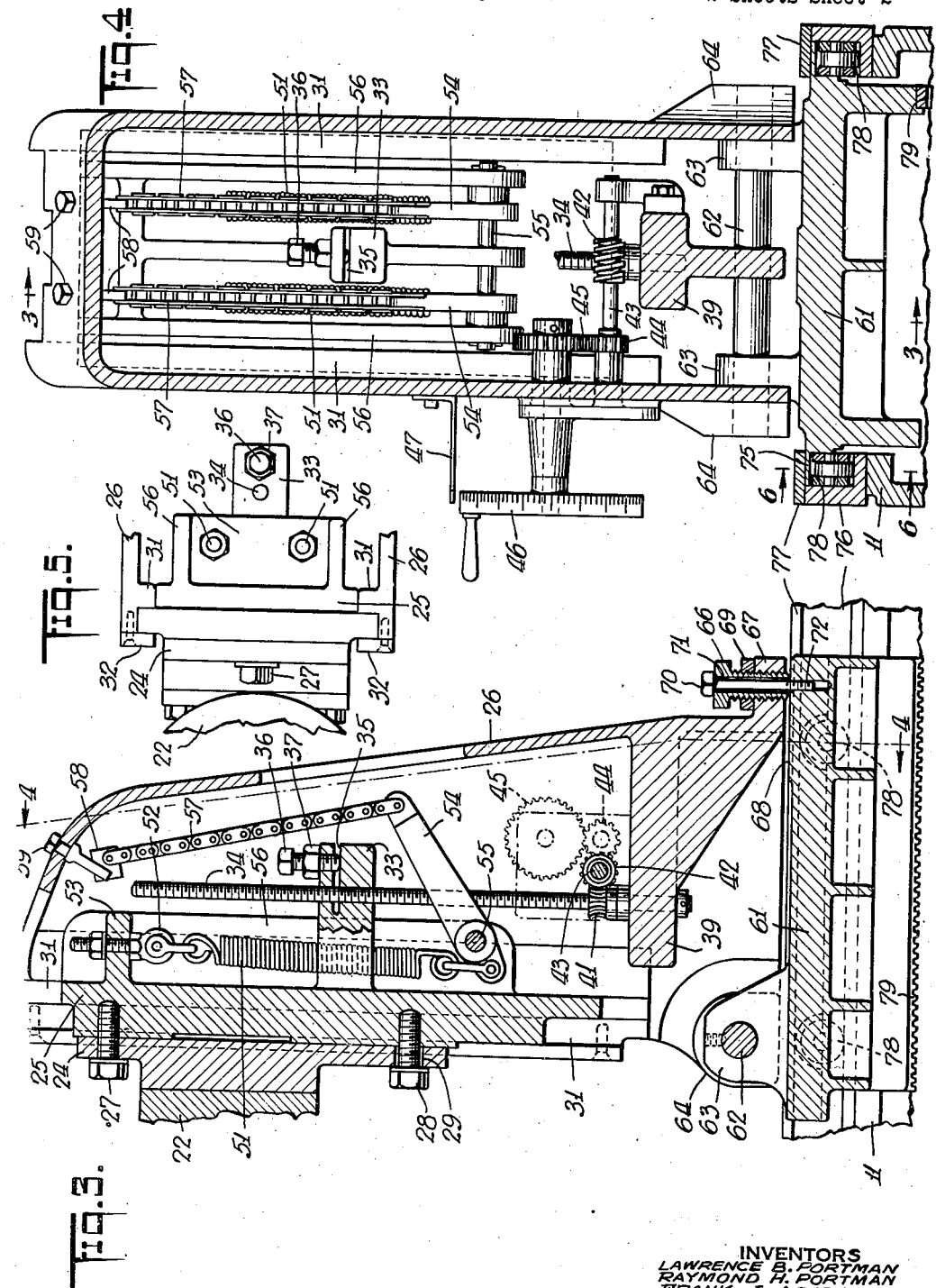
INVENTORS
LAWRENCE B. PORTMAN
RAYMOND H. PORTMAN
FRANK J. ACTON
BY
M. Theodore Simmons
ATTORNEY Patented Mar. 6, 1945

2,370,813

UNITED STATES PATENT OFFICE 2,370,813

GRINDING MACHINE

Lawrence B. Portman, Raymond H. Portman, and Frank J. Acton, Mount Vernon, N. Y.

Application September 21, 1942, Serial No. 459,208

16 Claims. (Cl. 51—166)

The present invention relates to improved construction of grinding machines whereby the same are rendered more efficient, have a longer useful life and have a more extended range of usefulness.

Among the objects of this invention are to provide an arrangement for effecting the relative movement of grinding head to work which is very compact, rugged and accurate, and in which relatively large movements of the dial control effect small adjustments between the grinding element and the work.

Other objects of this invention are the provision of a counterbalancing spring arrangement for the movable head which occupies small space and wherein very small movements of the springs occur.

Further objects of this invention are to provide an adjustable support for the slidable table which is universal in movement allowing great refinements of movement in leveling the table, taking up wear, etc.; and wherein simple adjustments are provided for the head around horizontal axes which are perpendicular to each other.

Other and further objects and advantages of this invention will be understood from this specification taken in conjunction with the accompanying drawings, in which—

Figure 1 is a side view of a grinding machine constructed according to this invention.

Fig. 2 is an end view of said machine, looking at the left hand end as seen in Fig. 1.

Fig. 3 is a central vertical section through the supporting column, looking from the side of the machine, on the line 3—3 of Fig. 4.

Fig. 4 is a vertical section of the supporting column, looking from the end of the machine, on the line 4—4 of Fig. 3, parts being broken away to facilitate the illustration.

Fig. 5 is a fragmentary plan view in enlarged detail showing the mounting of the grinding head support.

Fig. 6 is an enlarged detail of one of the supporting dollies for the table, shown in section taken on the line 5—5 of Fig. 4.

Fig. 7 is a detail view of the truck of one of the supporting dollies for the table.

This invention will be described in connection with a vertical grinding machine which employs a stationary mounting for the rotary work chuck and a movable mounting for the motor driven grinder which is adjustable with respect to the work chuck. This showing is by way of illustration of the invention, and the application thereof to other types of machines will be evident.

Referring to Figs. 1 and 2, the machine comprises, in general, a base 11 on which is mounted a rotary work chuck 12 driven by a motor 13 through belt 14, no attempt being made to show or describe this mounting and drive in detail as the same constitutes no part of the present invention. The base also encloses a coolant tank 15 on which is a motor driven pump 16 appropriately connected to a hose 17 and nozzle 18 suspended over the work chuck 12. The work area is enclosed by a guard 19. The grinding head 21 is carried by a motor 22 and driven through suitable gearing enclosed in housing 23.

Referring now to Figs. 3 and 4, the grinder motor 22 is secured to a plate 24 which is adjustable upon a support 25 that is, in turn, slidable upon the hollow supporting column 26, as will be described.

The motor plate 24 is held upon the support 25 by upper and lower bolts 27, 28, the lower bolt working in a transverse slot 29 in the plate 24 so that the plate may be adjusted from side to side of the machine about the axis of the upper bolt 27. Such adjustment moves the grinding head 21 with respect to the work by tilting its motor from side to side about an axis located well above the work level. This is one adjustment to accurately align the grinding head with the work. There may be more than one of the lower bolts 28.

The hollow column 26 has a pair of channels at opposite sides of the support 25, by means of which the vertical movement of the support is guided, such channels being formed by ribs 31 (Fig. 5) on the column and gibs 32 secured to the column. For such vertical moevment, the support has a block 33 near its center and projecting from the rear thereof which is threaded to receive a screw 34. The outer portion of the block that is threaded is transversely slotted, as shown at 35, and the parts are brought together by bolt 36, held in adjusted position by the lock nut 37, to insure a close fit at all times between the block 33 and the screw 34.

The screw is journaled in an inwardly extending supporting rib 39 which is integral with the column 26, and the screw 34 carries a worm wheel 41 which is driven by the worm 42, on a horizontal shaft 43. The worm shaft has a spur gear on the outer end thereof which meshes with a pinion 44 that is driven from spur gear 45 on the shaft of the hand wheel and dial 46, which is, in turn, appropriately journaled in and on the side of the column 26. The train of gearing effects a reduction in speed and movement between the hand wheel 46 and the screw shaft 34, so that large movements of the hand wheel effect only minute movements of the support 25 in progressive increments to afford extremely accurate adjustment of the grinding element to the work. For example, the hand wheel may be graduated in .0005" with one complete revolution of the wheel 46 equalling .050" of movement of the support 25 in the column 26. A pointer 47 mounted on the column 26 cooperates with the dial markings on the hand wheel 46.

The counterbalancing arrangement comprises a pair of coiled springs 51 respectively attached at one end to an eye bolt 52 mounted in a shelf 53 which is integral with the support 25 and extends rearwardly therefrom near its top. The springs are located on opposite sides of block 33 and at their opposite ends the springs are respectively attached to one end of a pair of levers 54. These levers fulcrum upon jack shaft 55 mounted in wings 56 which extend rearwardly from the support 25. It will be noted that the fulcrum 55 is very close to the axes of the springs 51 and that the end of the lever 54 to which each spring is connected has a very short radius. The opposite end of each lever 54 is much longer and extends upwardly at an acute angle to the wings 56. The outer end of each lever has pivoted thereto the lower link of a chain 57 and the opposite ends of the chains also are pivotally connected to blocks 58 carried on the ends of mounting screws 59 located near the top of the column 26. This arrangement allows for the shifting of the pivots for the outer ends of the levers 54 as the support is raised and lowered, and insofar as the function in this mechanism is concerned, these chains 57 could be replaced by rods having the same pivotal connections.

It will be evident that the weight of the support 25 and the mechanism carried thereby is sustained by the column 26 through the chains 57 and levers 54 with their attachment to the support and that this weight is counterbalanced by the tension of the spring 51 attached to the levers 54.

The raising and lowering of the grinder head is accomplished by rotation of the hand wheel 46 to rotate the screw 34 which causes the block 33 of the support 25 to travel along the screw thus elevating or lowering the support. As the support is elevated the springs 51 and their levers 54 are carried therewith, causing the levers to move about the pivotal connection thereof with the chains 57. It is true that by reason of the straight line vertical movement of the levers there is a pivoting of the levers about the fulcrum 55, but this movement is only very slightly in excess of the amount of the vertical adjustment. Consequently, there is very little movement of the springs 51 and very little variation in the tension thereof as the grinder head is vertically adjusted. With such counterbalancing and drive the vertical adjustment is easily and accurately made. At the same time all the counterbalancing and other mechanism is housed in the column 26.

There is one further adjustment for bringing the grinding element in accurate alignment with the work. The column 26 is itself pivotally mounted on a slidable table 61 by means of a shaft 62 that is journaled in a pair of lugs 63 on the table and in bosses 64 on the side walls of column 26. It will be noted that the axis of the shaft 62 is perpendicular to the axis of the bolt 27 around which the grinder head is adjustable from side to side. Adjustment of the column 26, on which the grinder head with its motor is supported, will tilt the head in a plane from front to rear of the machine and permit the grinding of concave surfaces.

The adjustment about the axis of the shaft 62 is done by means of an adjusting screw 66 which is adjustable in a lug 67 at the rear of column 26, the screw abutting against a boss 68 on the table 61. A lock nut 69 cooperates with the adjusting screw to hold the same in its adjusted position. To prevent vibration of the column, etc., a bolt 70 is passed through an enlarged central hole 71 in the adjusting screw and engages in a threaded hole 72 in the table 61. When the bolt 69 is screwed home the head thereof engages the head of the adjusting screw 66.

The slidable table 61 has a flange 75 on opposite sides thereof which flanges extend into channel shaped trackways formed by angle iron 76 mounted on base 11, and an overlying guide plate 77 secured thereto. The table is supported upon four or more rollers or wheels 78 for sliding movement along the trackway, for which purpose a rack 79 is affixed to the bottom of the table. Pinion 81 (Fig. 1) meshes with this rack and is fast upon shaft 82, suitably mounted in base 11 and having on the outer end thereof pilot wheel 83. Rotation of the pilot wheel moves the table backward and forward, carrying the grinder head from and to the work held by the chuck 12.

Alignment of the table is accomplished in the following manner: Each supporting wheel 78 is mounted in a truck 84 (Figs. 6 and 7) having front and rear projections 85, 86, which with vertical ears 87 define a space in which wheel 78 is rotatably mounted. The under side of the table flange 75 is cut away, as indicated at 88, to receive the ears 87 of each truck and the upper half of the wheel 78 carried thereby. There is a ball and socket connection between each truck and the table formed by a depression in the top of the rear projection 86 of the truck in which a ball 89 rests, the under side of the flange 75 having a somewhat similar depression into which the ball 89 also fits. The arrangement is such that there is a space between the top of the projection 86 and the flange 76 so that the truck may be tilted about the axle of the wheel 78. For this purpose the front projection 85 of the truck has a depression therein which receives the pointed end of an adjusting screw 91 which is adjustable in the adjacent flange 75 of the table. This is the equivalent of a second ball and socket connection between the table and the supporting truck.

The head of the screw 91 is housed in a cavity 92 of the flange. To adjust the screw 91 the table is moved by means of the pilot wheel 83 to bring the cavity 92 in register with an opening 93 in the guide plate 77 of the trackway, there being one of these openings in each of these trackway plates. A pivoted cover 94 for the opening is moved aside and a tool is applied to the head of screw 91 to turn the same. Turning the screw down separates the front 85 of the truck from the table flange, moving the truck about the axle of wheel 78, which exerts an upward pressure on the ball 89 and the flange 75 of the table 61. The ball and socket connection enables the wheel to accommodate itself to the conditions of wear, etc., normally encountered in apparatus of this character; and by using four of these adjustable wheel supports, one at each corner of the table, each wheel may be individually adjusted so that any desired adjustment may be obtained quickly and easily to level the table 61 and to take up for any wear. The lock nut 91A serves to hold the screw 91 in its adjusted position.

From the foregoing description it will be seen that there is here disclosed a grinding machine in which all operations thereof may be speedily and accurately accomplished, in which there is freedom from vibration, and in which a few simple and accessible adjustments allow for regulating the operations of the machine to a high degree of refinement.

Modifications may be made in the arrangement and location of parts within the spirit and scope of my invention, and such modifications are intended to be covered by the appended claims.

We claim:

1. A grinding machine comprising a base, a slidable table thereon, said table carrying a grinding element to be aligned for performing the grinding operation, trackways over which said table moves, means for moving the table back and forth, and means for supporting and adjusting the table on said trackways, such means comprising a truck adjacent each corner of said table, a wheel in each truck on which the table moves, a ball and socket connection between each truck and the table upon which the table is supported, and an adjusting means engaging each truck to adjust the position thereof to maintain said table level.

2. A grinding machine comprising a base, a slidable table thereon, said table carrying a grinding element to be aligned for performing the grinding operation, trackways over which said table moves, means for moving the table back and forth, and means for supporting and adjusting the table on said trackways, such means comprising a truck adjacent each corner of said table, a wheel in each truck on which the table moves, a ball and socket connection between one end of each truck and the table, and an adjusting means having a pointed element engaging the opposite end of each truck to adjust the position of the truck relative to said table and trackway.

3. A grinding machine comprising a base, a slidable table thereon, said table carrying a grinding element to be aligned for performing the grinding operation, trackways over which said table moves, means for moving the table back and forth, and means for supporting and adjusting the table on said trackways, such means comprising a truck, a wheel mounted therein on which the table moves, a ball and socket connection between said truck and table, and means for adjusting the position of the truck so as to maintain said table level.

4. A grinding machine comprising a base, a slidable table thereon, said table carrying a grinding element to be aligned for performing the grinding operation, trackways over which said table moves, means for moving the table back and forth, and means for supporting and adjusting the table on said trackways, such means comprising a truck, a wheel mounted therein on which the table moves, a ball at one end of said truck upon which the table is supported, and an adjustable means having a point upon which the table is supported upon the truck at the other end thereof.

5. A grinding machine comprising a base, a slidable table thereon, said table carrying a grinding element to be aligned for performing the grinding operation, trackways over which said table moves, means for moving the table back and forth, and means for supporting and adjusting the table on said trackways, such means comprising a truck, a wheel mounted therein on which the table moves, a ball at one end of said truck upon which the table is supported, and an adjusting means engaging the truck at its opposite end to adjust the position of the truck to maintain said table level.

6. A grinding machine comprising a base, a slidable table thereon, said table carrying a grinding element to be aligned for performing the grinding operation, trackways over which said table moves, means for moving the table back and forth, and means for supporting and adjusting the table on said trackways, such means comprising a truck adjacent each corner of said table, a wheel in each truck on which the table moves, and a pair of ball and socket connections between each truck and the table, one of which connections is adjustable.

7. A grinding machine comprising a base, a slidable table thereon, said table carrying a grinding element to be aligned for performing the grinding operation, trackways over which said table moves, means for moving the table back and forth, and means for supporting and adjusting the table on said trackways, such means comprising a truck adjacent each corner of said table, a wheel in each truck on which the table moves, a ball and socket connection between one end of each truck and the table, an adjusting screw for each truck, the same being mounted in the table and engaging the opposite end of said truck, guiding means above the table and coextensive with said trackways, and an aperture therein with which said screw may be brought into registry so as to be accessible for adjustment.

8. In a grinding machine, a motor, a grinding head carried thereby, a vertical column on which the motor is mounted, a horizontal support for the column, a horizontal pivotal mounting for the column on the support, the pivot being below the mounting of the motor, a lug on the column adjacent the support and spaced from the pivot, an adjusting screw movable in the lug and engaging the support so as to tilt the column about its pivot, a lock nut for holding the screw in its adjusted position, and a bolt passing through said adjusting screw and secured in said support for holding the column in adjusted position.

9. In a grinding machine, a motor, a grinding head carried thereby, a column, a pivotal mounting for the motor thereon, a support for the column, a pivotal mounting for the column on its support, the pivots being disposed at right angles to each other and substantially perpendicular to the motor shaft, means for adjusting the column about its pivot, and means for holding the motor and the column in their respective adjusted positions.

10. In a grinding machine, a motor, a grinding head carried thereby, a column, a pivotal mounting for the motor thereon, a slidable table on which the column is mounted, a pivotal mounting for the column on the table, the pivots being disposed at right angles to each other and substantially perpendicular to the motor shaft, means for holding the motor and the column in their respective adjusted positions, trackways over which said table moves, means for moving the table back and forth, and means for supporting and adjusting the table on said trackways, such means comprising trucks adjacent the corners of said table, wheels in said trucks on which the table moves, a ball and socket connection between each truck and the table, and means for adjusting the position of the truck with respect to the table and about said ball and socket connection.

11. In a grinding machine, a motor, a grinding head carried thereby, a slidable support for the motor, a hollow column in which the support is slidable, means carried by the column and connected to the support for adjusting the position thereof in the column, and a counterbalance comprising a coiled spring pivotally connected to the support near one end, a lever pivotally mounted on the support near the opposite end, the free end of the spring being connected to one end of the lever, and a movable pivot connecting the opposite end of the lever to said column.

12. In a grinding machine, a motor, a grinding head carried thereby, a slidable support for the motor, a hollow column in which the support is slidable, means carried by the column and connected to the support for adjusting the position thereof in the column, and a counterbalance comprising a pair of coiled springs pivotally connected to the support near the top thereof and located on either side of the adjusting means, a shaft mounted on said support near the lower end thereof and close to a vertical line intersecting the upper connection of said springs, a pair of levers pivoted on said shaft, the free ends of said springs being connected to one of the ends of said levers respectively, and movable pivot connections between the opposite ends of said levers and said column.

13. In a grinding machine, a motor, a grinding head carried thereby, a slidable support for the motor, a hollow column in which the support is slidable, means carried by the column and connected to the support for adjusting the position thereof in the column, and a counterbalance comprising a coiled spring connected at one end to said support, and pivoted connections between said column and the other end of said spring so that the weight of said support is transmitted through said springs, the connections being so arranged that only small changes occur in the tension of said spring between the full raised and the full lowered positions of said support.

14. In a machine tool, a motor, a tool carried thereby, a slidable support for the motor and tool, a hollow column on which the support is slidable, means carried by the column and connected to the support for adjusting the position thereof in the column, and a counterbalance comprising a coiled spring pivotally connected to the support near one end, a lever pivotally mounted on the support near the opposite end, the free end of the spring being connected to one end of the lever and a movable pivot connecting the opposite end of the lever to said column.

15. A machine tool comprising a base, a motor, a tool operated thereby, a horizontally slidable table on which said tool is mounted, trackways over which said table moves, means for moving the table back and forth, and means for supporting and adjusting the table on said trackways, said means comprising a truck adjacent each corner of said table, a wheel in each truck on which the table moves, and an adjusting means engaging the truck to adjust the position of said table.

16. A machine tool comprising a base, a tool, a horizontal slidable table on which said tool is mounted, trackways over which said table moves, means for moving the table back and forth, and means for supporting and adjusting the table on said trackways, such means comprising wheels adjacent each corner of said table, at least one of said wheels being mounted in a truck, a ball and socket connection between said truck and the table, and adjusting means engaging the truck to adjust the position of said table.

LAWRENCE B. PORTMAN.
RAYMOND H. PORTMAN.
FRANK J. ACTON.